Patented Aug. 30, 1938

2,128,599

UNITED STATES PATENT OFFICE 2,128,599

PRINTING PREPARATION

Otto Albrecht, Basel, and Max Bommer and Fritz Grieshaber, Riehen, near Basel, Switzerland, assignors to the firm Society of Chemical Industry in Basle, Basel, Switzerland No Drawing. Application November 30, 1936, Serial No. 113,529. In Switzerland December 2, 1935

10 Claims. (Cl. 8—70)

It has been found that textile fabrics, such as for example vegetable and animal fibers (cotton, artificial silk from regenerated cellulose, wool and silk) can be printed with advantage with dyestuffs which are dyed in a reduced state, i. e. with vat dyestuffs and sulfur dyestuffs, when using in the printing operation salts of the cymene sulfonic acids.

As mentioned above, dyestuffs to which the invention applies are vat dyestuffs of the indigoid series and the anthraquinonoid series, or sulfur dyestuffs such as the sulfurization products of carbazole indophenols. The invention is applicable to all kinds of textiles, whether in the form of fabrics, yarns or loose material, and may be applied in discharge printing or direct printing.

The sulfonic acid salts to be used in accordance with this invention are preferably used in the form of preparations which contain the dyestuffs and the assisting agents.

As salts there may be used for example the sodium, potassium, ammonium, iron or copper salts of the sulfonic acids. The salts with organic bases, such as for example salts with aniline, ethanolamine or pyridine are also applicable.

The sulfonic acid salts to be used may for example be incorporated with the printing paste or the dyestuffs during or after the production thereof, for example by mixing them or grinding them together with the dyestuff preparations or the dyestuff powder.

They may also be added to dyestuff preparations which are made for use in printing. Such preparations are, for example, those which may contain the reduced dyestuff in the form of its stable or unstable reduction product or the non-reduced dyestuff, further water-soluble alcohols, for example glycerol, ethylene glycol, thiodiglycol, or other hydrotropic agents, for example urea, benzylaniline sulfonic acid or salts of aromatic carboxylic acids; also reduction catalysts, for example anthraquinone, hydroxyanthraquinones or salts thereof, further reducing agents, for instance sodium hydrosulfite, and finally alkalies, for example sodium hydroxide, ammonium hydroxide, sodium carbonate, magnesium hydroxide, or potassium carbonate.

Printing pastes which contain the aforesaid compounds are in many cases better fixed than is the case with known printing pastes. The prints obtained with these new pastes are generally of stronger color than those obtained with the same proportions of dyestuff but without the use of the added compounds which are here in question.

The following examples illustrate the invention, the parts being by weight:—

Example 1

280 parts of a filter-press cake, containing 50 parts of 2:1:2':1'-naphthylthioindigo, are ground together with 66 parts of sodium cymene-sulfonate, 30 parts of sulfite cellulose waste liquor of 50 per cent. strength, 2 parts of sodium carbonate, 2 parts of hydroxyanthraquinone, and 100 parts of water, sifted, and evaporated to dryness, preferably under reduced pressure. When the finely ground dyestuff preparation thus obtained is made up into printing pastes in the usual manner, there are obtained prints which are stronger than the prints obtained in the same way, but without the use of the cited assisting agent. The dyestuff preparation can also be added directly to the potassium carbonate thickening containing sodium-formaldehyde-sulfoxylate, without being previously made into a paste with water.

Example 2

A printing paste is prepared as follows:—

100 parts of Cibanone Blue 3G ℗ double paste (Color Index No. 1173),
700 parts of potassium carbonate thickening containing per 100 parts
   11 parts of wheat starch
   17 parts of water
   25 parts of tragacanth mucilage (6 per cent. aqueous)
   20 parts of British gum
   17 parts of potassium carbonate and
   10 parts of glycerine, the whole boiled for ½ hour,
150 parts of sodium formaldehyde sulfoxylate and
50 parts of sodium cymene sulfonate, 1000 parts.

The print thus obtained has a stronger color than that produced in the same way but without the aid of the cited assisting agent.

Example 3

The printing paste is prepared according to the data of Example 2, the dyestuff used being Cibanone Blue GCD ℗ double paste (Supplement to Color Index, page 35, 1st column).

The print obtained in the usual manner has a stronger color than that produced in the same way but without the aid of the cited assisting agent.

Example 4

The printing paste is prepared according to the data of Example 2, the dyestuff used being Ciba Blue 2B double paste (Color Index No. 1184).

The print obtained in the usual manner has a stronger color than that produced in the same way but without the aid of the cited assisting agent.

*Example 5*

The printing paste is prepared according to the data of Example 2, the dyestuff used being Cibanone Gold Orange G ℗ double paste (Supplement to Color Index, page 35, 1st column).

The print obtained in the usual manner has a stronger color than that produced in the same way but without the aid of the cited assisting agent.

*Example 6*

100 parts of an aqueous paste, containing 16 parts of 2:1:2':1'-naphthylthioindigo, are mixed with 20 parts of glycerine and 10 parts of sodium cymene-sulfonate and the mixture evaporated under cautious conditions to 100 parts, and then ground and sifted. The dyestuff preparation thus obtained may be made up into printing pastes in the usual manner. When these are printed by the usual processes, with or without previous reduction of the dyestuff, stronger prints are obtained than when the operation is conducted without the aid of the cited assisting agent.

*Example 7*

10 parts of Cibanone Violent 2R (Supplement to Color Index, page 35, third column) or 10 parts of Cibanone Blue GCD ℗ (Supplement to Color Index, page 35, first column) or 10 parts of Ciba Blue 2B (Color Index No. 1184) in the form of a fine aqueous paste, are intimately mixed with 10 parts of potassium cymene-sulfonate and evaporated under cautious conditions, for example in a vacuum dryer or an atomizing dryer. If necessary, hydrotropic agents, such as diethylmetanilic acid or urea, or protective colloids such as sugar or sulfite waste liquor, can be added prior to the evaporation. The dyestuff powders thus obtained give stronger prints than the powders produced in the same way but without addition of potassium cymene-sulfonate. The difference is particularly great if the dyestuff powders are directly stirred into the potash thickening. These dyestuff preparations are also excellently suitable for use in padding and slop-padding processes.

*Example 8*

A printing paste is prepared from the following components:—

50 parts of a dyestuff paste, containing 30 per cent. of the dyestuff obtained according to the process of U. S. Patent 1,662,415 by sulfurizing the leuco compound of the condensation product from para-nitrosophenol and carbazole,
700 parts of the potassium carbonate thickening described in Example 2,
70 parts of sodium formaldehyde sulfoxylate,
130 parts of water and
50 parts of sodium cymene-sulfonate 1000 parts.

The goods are printed, steamed in the usual manner in a Mather-Platt apparatus, rinsed and soaped.

The print thus obtained has a stronger color than that produced in the same way but without the aid of the sodium cymene-sulfonate.

What we claim is:—

1. Process for printing vegetable and animal fibers, consisting in applying to the fiber a printing paste which contains a dyestuff selected from the group consisting of reduced and unreduced dyestuffs which are dyed in a reduced state, and a water-soluble salt of the cymene sulfonic acids.

2. Process for printing cotton, consisting in applying to the fiber a printing paste which contains a dyestuff selected from the group consisting of reduced and unreduced dyestuffs which are dyed in a reduced state, and a water-soluble salt of the cymene sulfonic acids.

3. Process for printing vegetable fibers, consisting in applying to the fiber a printing paste which contains a dyestuff selected from the group consisting of reduced and unreduced vat dyestuffs, and a water-soluble salt of the cymene sulfonic acids.

4. Process for printing vegetable fibers, consisting in applying to the fiber a printing paste which contains a dyestuff selected from the group consisting of reduced and unreduced 2:1:2':1'-naphthylthioindigo, and a water-soluble salt of the cymene sulfonic acids.

5. A vat dyestuff preparation, containing a dyestuff selected from the group consisting of reduced and unreduced dyestuffs which are dyed in a reduced state, water, glycerine and a salt of the cymene sulfonic acids.

6. A vat dyestuff preparation, containing a dyestuff selected from the group consisting of reduced and unreduced vat dyestuffs, water, glycerine and a salt of the cymene sulfonic acids.

7. A vat dyestuff preparation, containing a dyestuff selected from the group consisting of reduced and unreduced 2:1:2':1'-naphthylthioindigo, water, glycerine and a salt of the cymene sulfonic acids.

8. Printing colors, suitable for printing vegetable and animal fibers, characterized by a content of a dyestuff selected from the group consisting of reduced and unreduced dyestuffs which are dyed in a reduced state, a thickening agent and a salt of the cymene sulfonic acids.

9. Printing colors, suitable for printing vegetable and animal fibers, characterized by a content of a dyestuff selected from the group consisting of reduced and unreduced vat dyestuffs, a thickening agent and a salt of the cymene sulfonic acids.

10. Printing colors, suitable for printing vegetable and animal fibers, characterized by a content of a dyestuff selected from the group consisting of reduced and unreduced 2:1:2':1'-naphthylthioindigo, a thickening agent and a salt of the cymene sulfonic acids.

OTTO ALBRECHT.
MAX BOMMER.
FRITZ GRIESHABER.